Feb. 4, 1941. E. C. HORTON 2,230,595
MOTOR VEHICLE ACCESSORY SYSTEM
Filed March 4, 1937 2 Sheets-Sheet 2

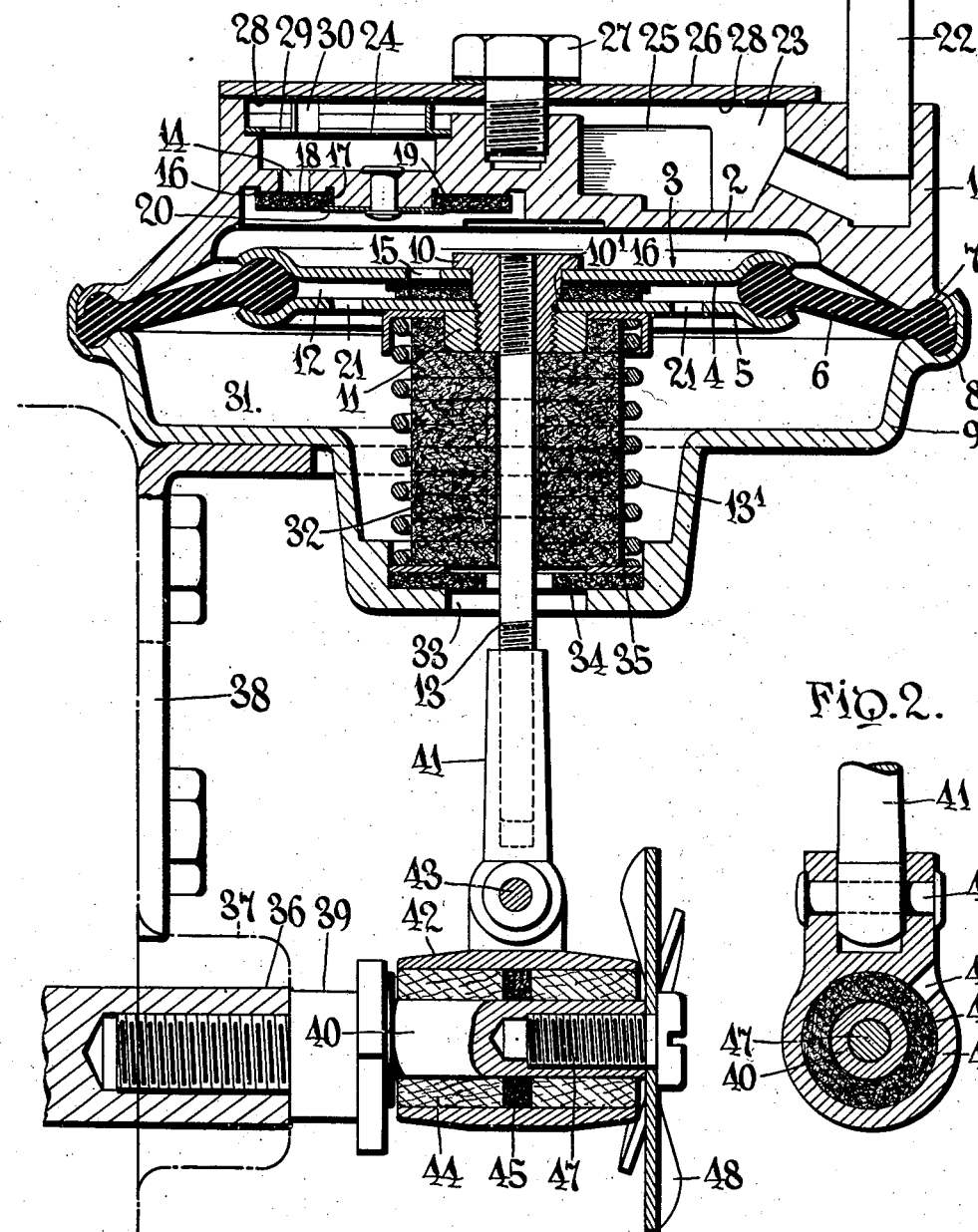

INVENTOR
Erwin C. Horton,
BY
Beau, Brooks, Buckley & Beau.
ATTORNEYS

Patented Feb. 4, 1941

2,230,595

UNITED STATES PATENT OFFICE 2,230,595

MOTOR VEHICLE ACCESSORY SYSTEM

Erwin C. Horton, Hamburg, N. Y., assignor to Trico Products Corporation, Buffalo, N. Y.

Application March 4, 1937, Serial No. 129,027

5 Claims. (Cl. 230—170)

This invention relates to a motor vehicle accessory system and primarily to an air pump adapted to be driven from a moving part of the vehicle to serve as a source of actuating pressure for one or more accessories with which the present day motor vehicle is equipped.

It has heretofore been proposed to provide an air pump driven from the crank shaft of a motor vehicle engine, the connection between the pump and its drive being made through a play connection for enabling the pump to operate intermittently or only as may be necessary to meet the demands of the accessory system. Such part time operation of the pump placed the connecting drive under severe strain and through shortened strokes the pump was subjected to much wear and tear. Furthermore, the pump was noisy in operation and required a low speed drive or source of power, such as the engine crank shaft, for greatest efficiency. This was primarily due to certain factors, including the inertia of the valves as well as the recoiling of the valve springs, constituting problems which have long confronted the manufacturer of pumps and resisted his efforts to provide an efficient pump for all speeds of operation developed by present day machinery.

The present invention has for its object to provide a practical pump of the reciprocatory type which is efficient at various speeds of operation and is particularly adapted for use on motor vehicle power plants to serve as a source of operating pressure for air driven accessories.

More particularly the invention resides in the provision of a pump wherein the valves controlling the inlet and outlet ports are highly sensitive to changes of fluid flow and are so mounted and disposed as to operate with great rapidity in opening and closing their respective ports at low as well as high speeds of operation of the pump.

The invention further has for its object to provide a pump which is longlived, the parts being so designed and combined as to render the pump durable in use and economical in manufacture.

In the accompanying drawings, showing a practical embodiment of the invention:

Fig. 1 is a vertical section through the pump showing it operatively related to its drive;

Fig. 2 is a transverse section through the pump driving eccentric;

Figure 3:
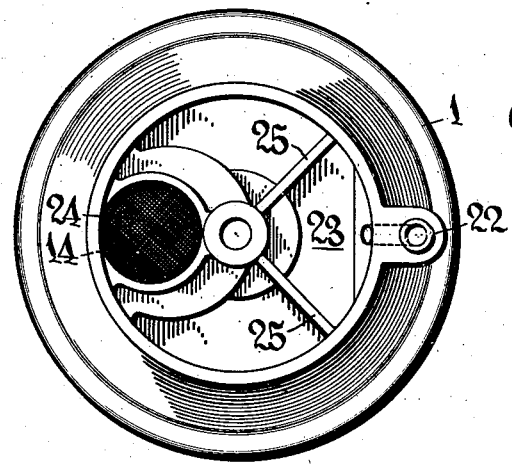
Figs. 3 and 4 are respectively top and bottom plan views of the upper section of the pump housing.
Figure 5:
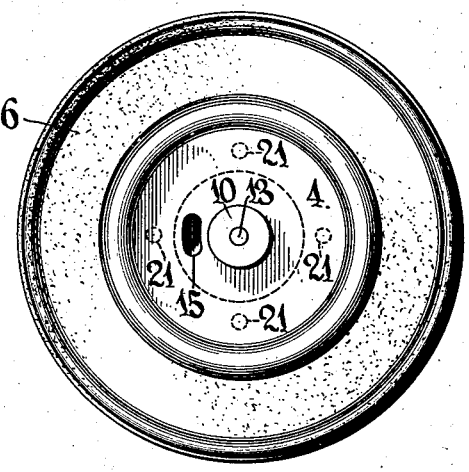
Fig. 5 is a top plan view of the fluid displacing member or piston.
Figure 4:
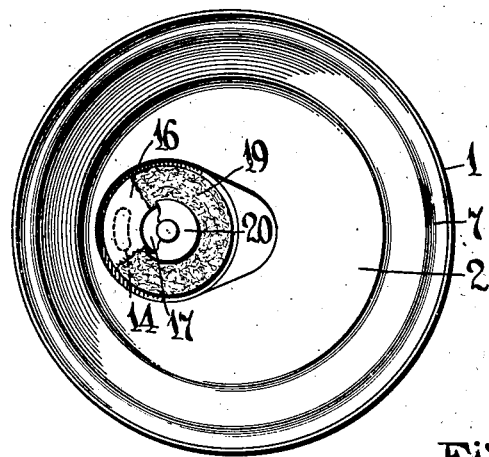
Figure 6:
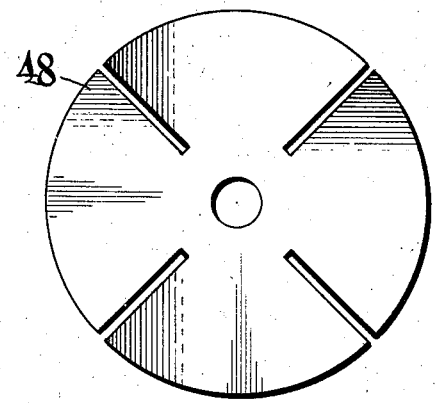
Fig. 6 is a detailed view of a part of the heat dissipating means employed.
Figure 7:
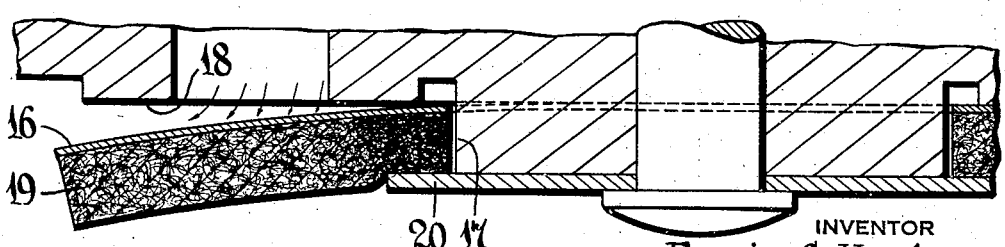
Fig. 7 is an enlarged view through one of the pump valves illustrating on an enlarged scale its action.

Referring more particularly to the drawings, the numeral 1 designates the main or chambered section of the pump housing having a chamber 2 which is alternately enlarged and ensmalled by the fluid displacing member or piston generally indicated at 3.

The illustrated piston construction partakes of the diaphragm type and, as depicted, embodies a pair of body plates 4 and 5 which have their marginal portions embrace the inner edge of an annular webbing or diaphragm 6. The outer edge of the diaphragm is firmly held in a seat 7 of the main housing section 1 by any suitable means, such as by a ring 8 which may be lapped interlockingly over the seat 7. This clamping ring is depicted as forming a part of the mounting section 9 of the pump housing. The diaphragm 6 is preferably formed of pure rubber so that owing to its elastic nature it will stretch or yield without buckling or folding during operation. The intermediate portion of the diaphragm may be formed with a permanent arch, if desired, to further guard against the diaphragm webbing folding upon itself and thereby weakening its structure. The body plates 4 and 5 of the piston are secured together at their centers by the tubular bolt 10 and its nut 11, the bolt having a shoulder 10' serving along with the embraced edge of the webbing to space the plates apart for forming a valve chamber 12 hereinafter referred to. The tubular bolt is internally threaded to adjustably receive the threaded end of a connecting rod 13, and consequently reciprocation of the connecting rod will obviously impart like movement to the connected portion of the piston.

The pump chamber 2 is provided with an inlet port 14 and an outlet port 15, the latter being preferably provided in the piston and opening into the valve chamber thereof. These ports are valve controlled, and an important feature of this invention is the formation and mounting of the valves by which they are rendered highly sensitive for rapid opening and closing movements whether the pump is operating slowly or at an excessively high speed.

According to the preferred embodiment each valve is flexible and freely movable in action. It comprises a flat annular member 16 which is loosely guided (on a boss 17 in the case of the inlet valve and on the tubular bolt 10 in the case of the outlet valve), and is held on the valve seat 18 by an overlying piece of felt 19 or other light and springy fiber which may be readily carried with the valve in its opening movement without materially retarding its opening progress, while at the same time providing a sufficient resiliency for urging it toward its seat. The felt is lightly matted and yet possesses sufficient body to afford a resilient backing for the valve. A retaining disk 20 holds the felt on the inlet valve while the plate 5 of the piston assembly serves a like function in connection with the felt of the outlet valve. The piston plate 5 is provided with one or more openings 21 through which the air may leave the valve chamber 12.

Each valve 16 is of sufficient lightness and possessed of such broad surface area as to float or move promptly with changes in the direction of flow of the air currents. For this purpose the valve is exceedingly thin, substantially foil-like in thickness, and is formed of a metal having resilient and self-sustaining characteristics. By way of illustration, a brass valve having a thickness of .002 of an inch has proved practical in giving to the valve a body sufficient to respond quickly to directional changes in air flow as well as properly seal the valve port. Furthermore, each valve is flexible in character to render it self-conforming to its seat and thereby effect a better sealing contact between the valve and the seat.

While the valve is bodily movable to and from its operative position, its valving action is more reed-like and the line of bend is progressive at opposite sides of the guiding boss rather than a bodily lifting of the entire valve from its seat. This insures a more rapid valve movement. To accomplish this reed-like movement of the valve the port is disposed to one side of the guiding boss so that the air movement through the port will cause the valve to flex at one side from its seat regardless of the delay in the opposite side portion of the valve to follow such given tendency. By reason of its loose mounting on the guiding boss the valve is free to creep in a circular path about the boss and thereby present an ever changing valve portion to the seat. This precludes the valve from becoming impaired through uneven wear and consequently insures consistent valving of the port.

The pump has a nipple 22 for connection to an air or suction operated accessory, such as a windshield cleaner, and this nipple discharges into a pulsation dampening chamber 23 at one side thereof. The inlet port 14 opens from the opposite side of the chamber through a filter or screen 24 between the port 14 and the nipple 22 the chamber is provided with one or more baffles 25 which serve to dampen the pulsations resulting from the rapid inflow of air increments. The chamber 23 is accessible upon removal of a cover plate 26 which is detachably secured as by the screw 27, a suitable packing gasket 28 underlying the closure plate 26. The filter or screen 24 is detachably held in position by a split retaining ring 29, the latter having upstanding lugs 30 serving as a finger hold and also cooperating with the closure plate in preventing unauthorized displacement of the resilient retaining ring.

The intermittent air exhaustion from the pump, after passing through the piston openings 21 into the chamber 31, is muffled by a fibrous body 32 which is composed of a stack of lightly felted disks enclosed by the spring 13' about connecting rod 13. This fibrous body is readily compressible and expansible with the movement of the pump piston and at the same time permits the air to readily flow therethrough. The mounting section 9 of the pump housing is formed with an opening 33 through which the connecting rod 13 freely moves unguided by walls thereof, the clearance space between the wall of the opening and the pump or connecting rod 13 being more or less fully bridged by a closure disk or ring 34 of light felt. This ring is held in position by a wearing ring 35 on which the spring 13' as well as the felt body 32 are also supported. The felt body 32 and the felt ring 34 are primarily for dampening the pulsations or puffs of air as they flow from the pump chamber 31 at the exhaust side of the pump so as to render the latter exceedingly quiet in operation.

The pump is operated from a rapidly revolving part of the motor vehicle, such as the shaft 36 of the generator 37 on which the pump is conveniently mounted as by a bracket 38. By this arrangement the pump will supply ample pressure or suction for accessory operation whether the vehicle engine is operating slow or fast. The shaft 36, or an extension 39 thereof, is provided with a crank 40 having a throw sufficient to reciprocate the pump piston in a practical and satisfactory manner. By way of example, the total throw of the crank 40 when determined at approximately .170 of an inch has been found to be satisfactory and practical for both fast and slow piston operation without subjecting the parts to unnecessary wear and tear and at the same time give the desired degree of suction or vacuum for the efficient operation of air driven accessories.

The degree of suction or operating pressure may be regulated by varying the clearance space in the pump chamber. This is accomplished herein by forming the connecting rod 13 with an extensible section 41 which is threaded for adjustment, whereby the uppermost position of the piston may be determined. The more the clearance in chamber 2 is reduced at the uppermost position of the piston, the greater will be the degree of vacuum produced by the pump.

The lower end of the composite connecting rod is joined to a bearing sleeve 42 on the crank 40 by a transverse pivot pin 43 which permits a certain amount of relative movement incidental to the unguided reciprocation of the connecting rod. The bearing sleeve 42 is provided with a divided bushing 44 including an oil containing pad 45 which may have its oil supply conveniently replenished through an opening 46 in the bearing sleeve 42. The divided bushing 44 is preferably formed of wood oil impregnated since it stands up well at high speed and requires little lubrication.

However, wood is a poor conductor of heat and when the pump is operating at a speed of 5000 or 6000 R. P. M. the heat generated would ordinarily be so great as to readily impair the bearing. To avoid this impairment and thereby lengthen the period of usefulness of the parts, means are provided to dissipate the heat generated. According to the present disclosure the heat dissipating means comprises a heat conducting rod 47 which will readily absorb and transmit the heat from the crank pin and maintain the latter at a comparatively low temperature. The heat conducting rod may be of aluminum, by way of example, and is fitted into an axial bore formed in the outer end of the crank 40, such heat transmitting pin extending sufficiently into the crank pin to draw the heat from that portion of the pin which is rotating in the bushing 44. Fixed to the outer end of the heat transmitting rod is a heat dissipating disc 48 which may have its heat discharging capacity increased by being radially slitted at intervals and having the divided portions offset to increase the air flow thereover for greater heat dissipation. This provides a simple and effective means for maintaining the crank bearing cool and thus avoid burning out the bearing while operating at excessively high speeds of rotation.

The valve disc or member, while stated as being preferably of metal, is flexible so as to readily conform to the surface about the port which it closes. This does away with the necessity of accurately grinding or finishing off the valve seat. The valve possesses a certain degree of inherent resiliency so as to flex from and toward the seat. By having the port to one side of the valve anchorage, the valve will easily open by lifting from its seat, such flexing movement of the valve being progressive along the opposite sides of the valve anchorage. The fibrous pad or felt 19 provides a flexible backing for the valve during this bending movement. The progressive movement of the line of bend is followed by such flexible backing so as to provide for greater uniformity and efficiency in the valving action. By use of this flexible valve backing, which provides sufficient resiliency to normally hold the valve disc on its seat, the valve may readily flex transversely as well as move or creep about its point of loose anchorage, the pressure applied to the valve by the fibrous backing being substantially uniform at all times, regardless of the creeping action of the valve. Furthermore, the fibrous backing is of very light formation and imposes very little additional weight upon the valve so that the latter is free to respond to changes in the air movements through the underlying port. While in some instances the fibrous backing may be eliminated, yet for quietness and greater efficiency in the operation of the pump under all operating conditions, the presence of the flexible backing is desired.

The pump is quiet in operation, the spring 13' serving at all times to hold the piston or air displacing member, with its operating parts, under tension to avoid all rattle and loose play in the mechanism.

While the foregoing description has been given in detail it is merely illustrative of the inventive principles involved which may be applied to other physical embodiments without departing from the scope and spirit of the invention claimed.

What is claimed is:

1. A fluid check valve for an air pump comprising a port and a valve comprising an annular resilient disc with its marginal portion seating over the port, and means loosely fitting in the central opening of the valve and acting to guide bodily movement of the latter to and from its seat, the marginal portion of the disc being flexible to enable its having both bending and bodily movements, and said disc being free to rotate about its guide means.

2. A fluid check valve for a high speed air pump, comprising a guide post, a disc centrally apertured freely to receive the post for loose bodily movement thereon and having valving margins transversely flexible for movement away from and toward the valve seat along lines of bend progressing transversely of the guide post, the central aperture of the disc having sufficient clearance about the post to permit the flexing to progress at opposite sides of the post.

3. A fluid check valve for a high speed air pump, comprising a valve disc centrally apertured to be mounted loosely on a guiding post for free bodily movement thereon and having its marginal portions readily flexible during the initial portion of the bodily movement to initiate such bodily movement.

4. A high speed air pump comprising a housing provided with a chamber, and a short stroke fluid displacing member movable back and forth from and to a position of substantially total collapse of the chamber, said pump having inlet and outlet passages provided with valve means for effecting uni-directional flow of air through the chamber, the valve means for one of said passages comprising an annular disc freely guided at its center for bodily movement and of such resiliency as to flex concurrently with the bodily movement.

5. A high speed suction air pump having a chamber and a relatively movable fluid displacing member with means for operating the moving one of said elements, inlet and outlet passages for the chamber, and valve means for each of the passages comprising port means and a readily flexible disc of approximately .002 of an inch in thickness and guided at its center for bodily movement with its marginal portions free to flex and bodily move concurrently from the port means.

ERWIN C. HORTON.